(12) United States Patent
Loprieno et al.

(10) Patent No.: US 10,985,847 B2
(45) Date of Patent: Apr. 20, 2021

(54) SECURITY OVER OPTICAL TRANSPORT NETWORK BEYOND 100G

(71) Applicant: Cisco Technology, Inc., San Jose, CA (US)

(72) Inventors: Gilberto Loprieno, Milan (IT); Scott Roy Fluhrer, North Attleboro, MA (US); Emanuele Umberto Giacometti, Cirie' (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 255 days.

(21) Appl. No.: 15/849,959

(22) Filed: Dec. 21, 2017

(65) Prior Publication Data
US 2019/0199449 A1 Jun. 27, 2019

(51) Int. Cl.
*H04B 10/85* (2013.01)
*H04Q 11/00* (2006.01)
(Continued)

(52) U.S. Cl.
CPC ............ *H04B 10/85* (2013.01); *H04J 3/1652* (2013.01); *H04L 9/14* (2013.01); *H04L 9/3236* (2013.01);
(Continued)

(58) Field of Classification Search
CPC .......... H04B 10/85; H04J 3/1652; H04L 9/14; H04L 9/3236; H04L 63/0428;
(Continued)

(56) References Cited

U.S. PATENT DOCUMENTS

| 8,462,784 B2 | 6/2013 | Loprieno et al. |
| 8,942,379 B2 | 1/2015 | Loprieno et al. |

(Continued)

OTHER PUBLICATIONS

"Interfaces for the optical transport network", Series G: Transmission Systems and Media, Digital Systems and Networks, Digital terminal equipments—General, Series Y: Global Information Infrastructure, Internet Protocol Aspects and next-Generation Networks, Internet of Things and Smart Cites, Recommendation ITU-T G.709/Y.1331, Jun. 2016, pp. 1-100.

(Continued)

*Primary Examiner* — Shin-Hon (Eric) Chen
*Assistant Examiner* — Jessica J South
(74) *Attorney, Agent, or Firm* — Edell, Shapiro & Finnan, LLC

(57) ABSTRACT

A method divides data traffic into multiple optical transport units formatted according to an optical transport network (OTN) standard. The multiple optical transport units include a master optical network unit and one or more slave optical network units. Each optical network unit includes overhead and a payload. The overhead includes used overhead specifically defined in the OTN standard and unused overhead not specifically defined in the OTN standard. The method encrypts each optical network unit with a respective one of multiple encryption keys, defines security control parameters identifying the multiple encryption keys, and inserts the security control parameters into the unused overhead of a first slave optical network unit among the one or more slave optical network units. The method transmits the optical network units in encrypted form.

20 Claims, 13 Drawing Sheets

(51) Int. Cl.
*H04L 29/06* (2006.01)
*H04L 9/14* (2006.01)
*H04J 3/16* (2006.01)
*H04L 9/32* (2006.01)

(52) U.S. Cl.
CPC ........ *H04L 63/0428* (2013.01); *H04L 63/123* (2013.01); *H04Q 11/0066* (2013.01); *H04L 2209/30* (2013.01); *H04L 2209/34* (2013.01)

(58) Field of Classification Search
CPC ............... H04L 63/123; H04L 2209/30; H04L 2209/34; H04Q 11/0066
See application file for complete search history.

(56) References Cited

U.S. PATENT DOCUMENTS

| | | |
|---|---|---|
| 2014/0044262 A1 | 2/2014 | Loprieno et al. |
| 2014/0362989 A1* | 12/2014 | Chiesa ...................... H04L 9/12 380/256 |
| 2014/0380056 A1* | 12/2014 | Buckley ................ H04L 9/3263 713/171 |
| 2016/0149867 A1 | 5/2016 | Lohr |
| 2017/0171163 A1 | 6/2017 | Gareau et al. |
| 2017/0230338 A1 | 8/2017 | Loprieno et al. |
| 2017/0230736 A1 | 8/2017 | Su et al. |
| 2017/0257169 A1 | 9/2017 | Kitamura et al. |
| 2018/0102834 A1* | 4/2018 | Ibach ................. H04B 10/0793 |
| 2018/0295103 A1* | 10/2018 | Sarwar .................. H04L 9/0894 |
| 2019/0166134 A1* | 5/2019 | Tzeng ................. H04L 63/1425 |

OTHER PUBLICATIONS

"Interfaces for the optical transport network", Series G: Transmission Systems and Media, Digital Systems and Networks, Digital terminal equipments—General, Series Y: Global Information Infrastructure, Internet Protocol Aspects and next-Generation Networks, Internet of Things and Smart Cites, Recommendation ITU-T G.709/Y.1331, Jun. 2016, pp. 101-200.

"Interfaces for the optical transport network", Series G: Transmission Systems and Media, Digital Systems and Networks, Digital terminal equipments—General, Series Y: Global Information Infrastructure, Internet Protocol Aspects and next-Generation Networks, Internet of Things and Smart Cites, Recommendation ITU-T G.709/Y.1331, Jun. 2016, pp. 201-259.

Steve Gorshe, "A Tutorial on ITU-T G.709 Optical Transport Networks (OTN)", Technology White Paper, 1 Document No. PMC-2081250, Issue 1, Jul. 2009, 81 pages.

Per Harlad Knudsen-Baas, "OTN switching", Norwegian University of Science and Technology, Department of Telematics, Jun. 2011, pp. 1-100.

Per Harlad Knudsen-Baas, "OTN switching", Norwegian University of Science and Technology, Department of Telematics, Jun. 2011, pp. 101-140.

Steve Gorshe, "The Evolution of ITU-T G.709 Optical Transport Networks (OTN) Beyond 100Gbit/s", White Paper, ESC-2170438 White Paper Revision 1.0, Microsemi, Mar. 2017, 56 pages.

\* cited by examiner

FIG.8

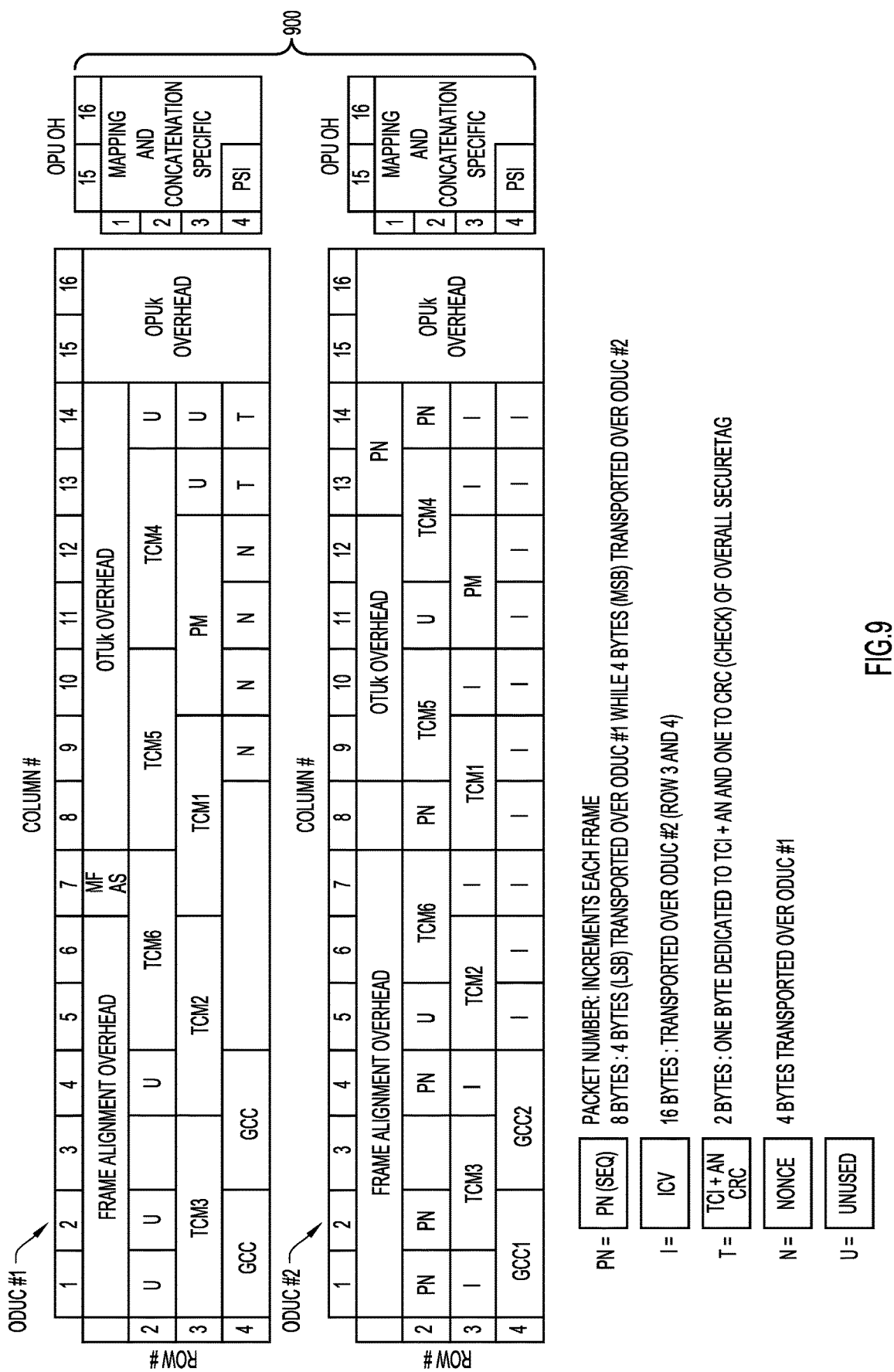

| ODUC #2 → | COLUMN # | | | | | | | | | | | | | | | |
|---|---|---|---|---|---|---|---|---|---|---|---|---|---|---|---|---|
| ROW # | 1 | 2 | 3 | 4 | 5 | 6 | 7 | 8 | 9 | 10 | 11 | 12 | 13 | 14 | 15 | 16 |
| 1 | FRAME ALIGNMENT OVERHEAD | | | | | | MFAS | PN | OTUk OVERHEAD | | | | PN | PN | | |
| 2 | PN | PN | PN | PN | PN | TCM6 | | N | TCM5 | — | — | TCM4 | — | — | OPUk OVERHEAD | |
| 3 | — | TCM3 | | | | TCM2 | — | TCM1 | | — | PM | — | — | — | | |
| 4 | GCC1 | | GCC2 | | | | | | — | — | — | — | T | T | | |

1000

OPU OH
| | 15 | 16 |
|---|---|---|
| 1 | MAPPING AND CONCATENATION SPECIFIC | |
| 2 | | |
| 3 | | |
| 4 | PSI | |

PN = PN (SEQ) — PACKET NUMBER: INCREMENTS EACH FRAME 8 BYTES

I = ICV — 16 BYTES : TRANSPORTED OVER ODUC #2 (ROW 3 AND 4)

T = TCI + AN CRC — 2 BYTES : ONE BYTE DEDICATED TO TCI + AN AND ONE TO CRC (CHECK) OF OVERALL SECURETAG

N = NONCE — 1 BYTE : TRANSPORTED OVER ODUC #2. (OPTIONAL), A SINGLE BYTE TRANSPORTED BUT COMBINED WITH MFAS (MULTIFRAME INDICATOR) A STRING UP TO 16 BYTES IS TRANSPORTED

U = UNUSED

SECURITY OVER OPTICAL TRANSPORT NETWORK BEYOND 100G

TECHNICAL FIELD

The present disclosure relates to security protection for optical transport networking beyond 100 Gigabits/sec.

BACKGROUND

In an optical transport network (OTN), client signals based on various standards such as synchronous digital hierarchy (SDH), Ethernet, and the like are accommodated and transmitted. To cope with an increase in speed and volume of client traffic, the International Telecommunication Union (ITU) has presented "Recommendation ITU-T G.709/Y.1331 (February 2012, June 2016) Interfaces for the Optical Transport Network," which extends traditional 1 Gbps (G), 40 G, and 100 G optical transport to data rates "beyond 100 G" ("B100 G"). The aforementioned Recommendation is thus referred to herein as the "B100 G standard" or more simply as "B100 G." The B100 G standard introduces an optical transport unit-Cn (OTUCn) exceeding 100 G, where "C" is a Roman numeral for 100 (or "100 G"), and "n" represents an integer multiple.

BRIEF DESCRIPTION OF THE DRAWINGS

FIG. 8 is an illustration of unused fields in overhead for ODUCn, where n>1, according to an example embodiment.

FIG. 9 is an illustration of an overhead allocation of security control information across overhead of both ODUC #1 and ODUC #2 of ODUCn, according to an example embodiment.

FIG. 10 is an illustration of an overhead allocation of security control information only in overhead of ODUC #2, according to an example embodiment.

FIG. 11 is an illustration of an Ethernet frame protected using Media Access Control Security (MACsec) in accordance with IEEE 802.1AE.

DESCRIPTION OF EXAMPLE EMBODIMENTS

Overview

A method divides data traffic into multiple optical transport units formatted according to an optical transport network (OTN) standard. The multiple optical transport units include a master optical transport unit and one or more slave optical transport units. Each optical transport unit respectively includes overhead and a payload. The overhead includes used overhead specifically defined in the OTN standard and unused overhead not specifically defined in the OTN standard. The method encrypts each optical transport unit with a respective one of multiple encryption keys, defines security control parameters identifying the multiple encryption keys, inserts the security control parameters into the unused overhead of a first slave optical transport unit among the one or more slave optical transport units, and after the inserting, transmits the optical transport units in encrypted form.

Example Embodiments

Figure 1:
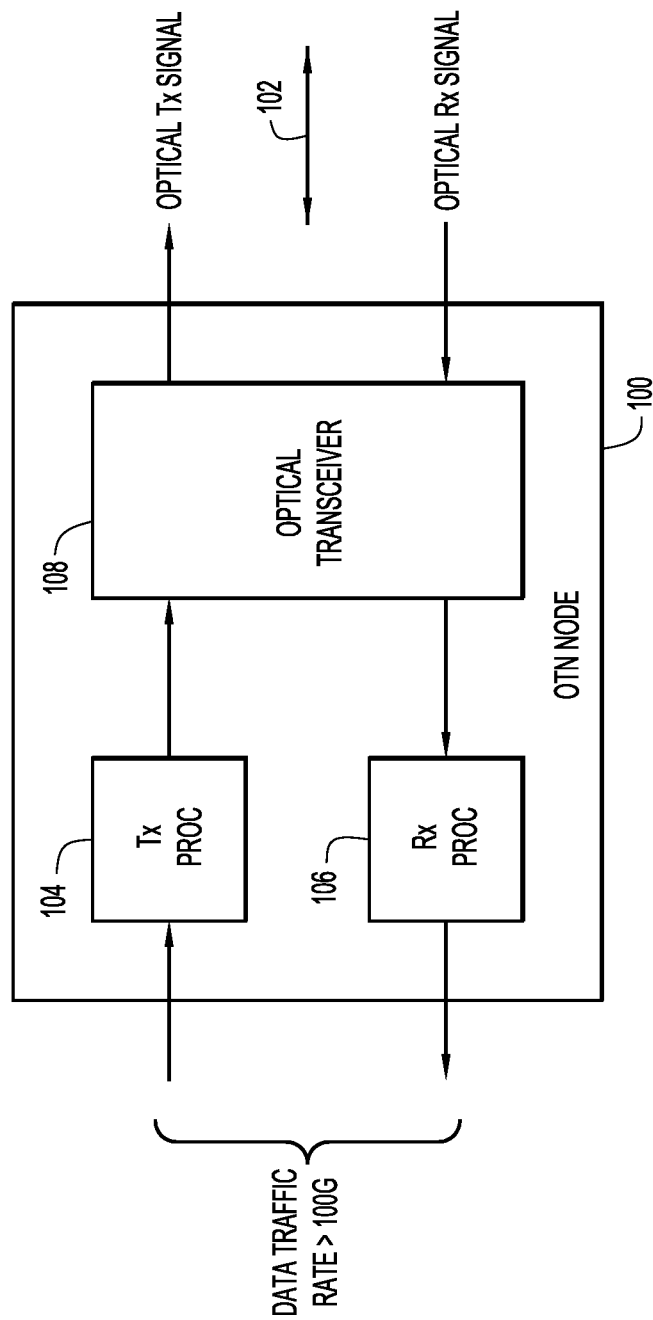
FIG. 1 is a high-level block diagram of a network device or node configured to operate in accordance with the B100 G OTN standard (or simply "B100 G"), extended to include security protection, according to example embodiment.

While the B100 G standard defines a basic frame structure or format for OTUCn, including payload and overhead areas, the standard does not define or provide for security protection for OTUCn, such as encryption and authentication. With reference to FIG. 1, there is a high-level block diagram of an example network device or node 100 configured to operate in accordance with the B100 G OTN standard (or simply "B100 G"), extended to include security protection in accordance with embodiments presented herein. Node 100 communicates with other similarly configured network devices or nodes over an optical link 102. In accordance with embodiments presented below, network device 100 extends or modifies B100 G to provide security protection to the OTUCn frame structure. Network device 100 includes a transmit (TX) processor 104, a receive (RX) processor 106, and an optical transmitter/receiver 108 (i.e., an optical transceiver 108).

At a high-level, in a transmit direction, TX processor 104 (i) receives data traffic (e.g., client traffic) having an aggregate data rate that exceeds 100 G, such as n×100 G (where n>1), (ii) converts the traffic into frames formatted in accordance with B100 G, such as 100 G frames for OTUCn, (ii) adds security protection to the frames in accordance with embodiments presented herein, and (iii) provides the security protected frames to optical transceiver 108. The security protection may include encryption and/or authentication of the 100 G frames. Optical transceiver 108 converts the security protected frames from an electrical signal to an optical signal (e.g., to a dense wavelength division multiplex (DWDM) signal) and transmits the optical signal over optical link 102.

In a receive direction, optical transceiver 108 receives from optical link 102 an optical signal carrying data traffic having a data rate in excess of 100 G, e.g., n×100 G, formatted according to B100 G, and to which security protection has been added as described above. Optical transceiver 108 converts the optical signal to an electrical signal, and provides the electrical signal to RX processor 106. At a high-level, RX processor 106 (i) performs frame processing on the electrical signal, in reverse of the frame processing performed at a corresponding transmit processor, to recover the protected data traffic, and (ii) removes the security protection from the protected data traffic to recover the data traffic.

B100 G extends traditional transport to data rates beyond 100 G. The B100 G family of interfaces, named "OTUCn," is defined as n×100 G, or n×OTUC, where the OTUC is the basic 100 G frame/element. Thus, to achieve data rates beyond 100 G, each of the n OTUCs is multiplexed into an OTUCn and transported over optical link 102, e.g., as a DWDM signal. For example, OTUCn multiplexes frame elements OTUC1-OTUCn. This is a modular structure and can support 400 G (OTUC4 four times OTUC) or 1T (OTUC10 ten times OTUC) or any new future protocol since the structure uses multiples of a 100 G frame (or multiples of OTUC). A frame structure for OTUCn is described below in connection with FIG. 2.

Figure 2:
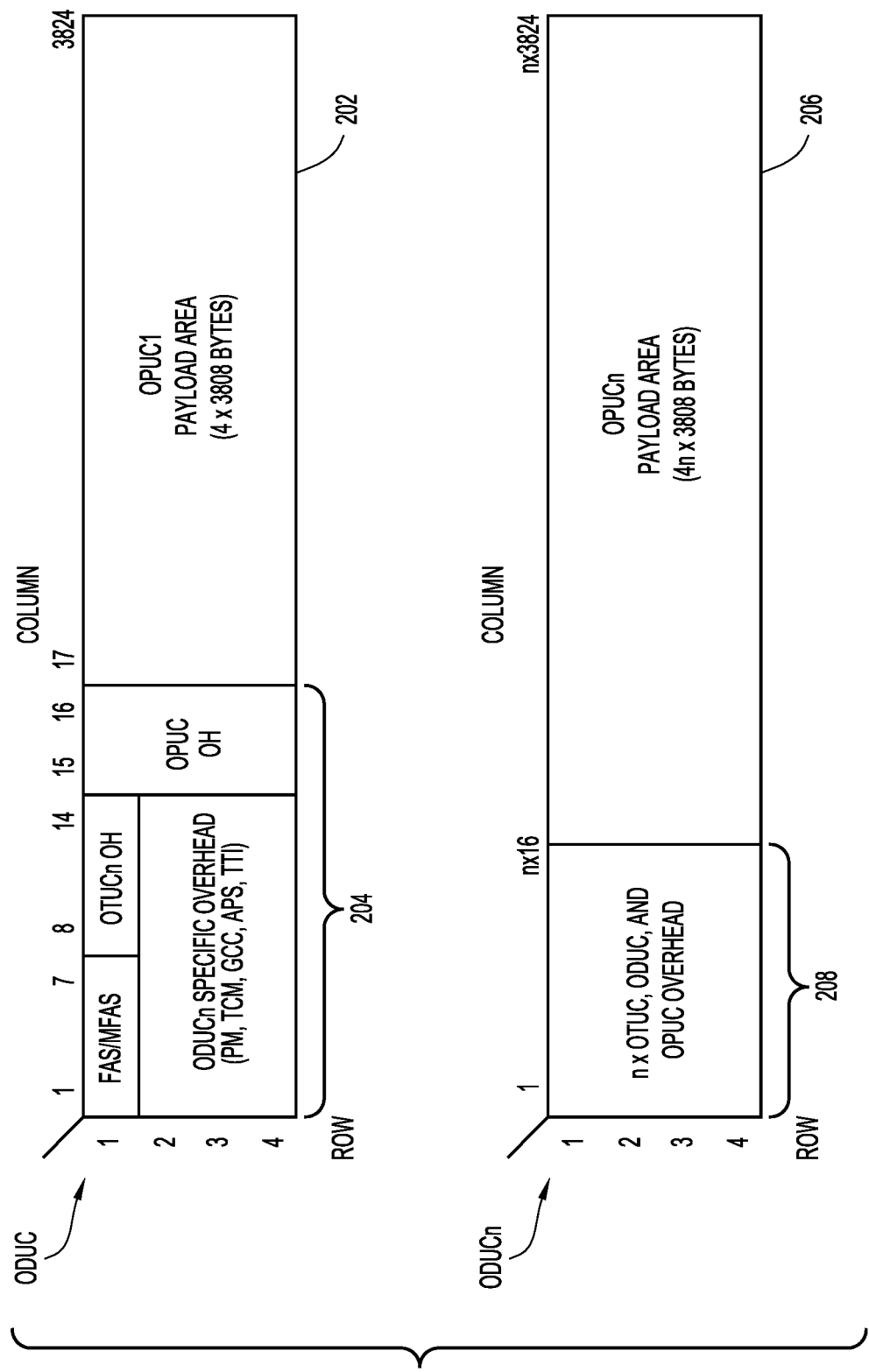
FIG. 2 is an illustration of frame structures/formats for B100 G, including a 100 G optical data unit (ODUC) frame (simply referred to as an "ODUC") and an OTUCn frame (simply referred to as an "OTUCn"), according to example embodiment.

With reference to FIG. 2, there is an illustration of example frame structures/formats for B100 G, including a 100 G optical data unit (ODUC) frame (referred to simply as an "ODUC") and an OTUCn frame (referred to simply as an "OTUCn"). The ODUC represents a base 100 G element for the OTUCn. The ODUC is identical to ODU4, except there are no fixed stuff columns in the payload area. The ODUC includes a payload area 202 and overhead (OH) 204. Overhead 204 includes 100 G optical packet unit (OPUC) OH, ODUC OH, OTUC OH, and fields for a Frame Alignment Signal (FAS)/Multi-Frame Alignment Signal (MFAS), as shown in FIG. 2. The ODUC forms the basis of a corresponding OTUC that is the same as the ODUC, except that the OTUC includes populated FAS/MFAS fields. The ODUC and the OTUC differ in that the OTUC includes populated FAS/MFAS and OTUC OH fields, while the ODUC does not. Accordingly, the ensuing description sometimes uses the terms ODUC and OTUC interchangeably, with the understanding that the two frames differ with respect to population of the FAS/MFAS and OTUC HO fields. It is understood that the OTUC, the ODUC, and the OPUC are specific forms or formats of frames generically referred to as an optical transport unit, an optical data unit, and an optical packet unit, respectively.

B100 G multiplexes n×OTUC (i.e., n OTUCs) into the OTUCn to achieve an aggregate rate of n×100 G for the OTUCn. The OTUCn includes a payload area 206 and overhead 208, as shown in FIG. 2. The OTUCs (also referred to as "OTUC slices") of the OTUCn are interleaved in a defined manner so that OPUCn tributary slots (TSs) have a known order. For transmission, however, each OTUC is treated individually as a 100 G entity. The individual TS are interleaved into the OPUCn contiguous payload area on a 16-byte (128-bit) block basis. Each 20 nsec TS occupies 16 bytes at a time in a fixed round-robin manner. This 16-byte TS interleaving granularity maintains a consistent 16-byte-modularity for both the OTUC/ODUC/OPUC overhead and the TS. Moving to 16-byte TS interleave granularity rather than the current single byte granularity is much more convenient with high B100 G data rates and the associated wide data buses within digital processors that process the OTUCn frames.

Figure 3:
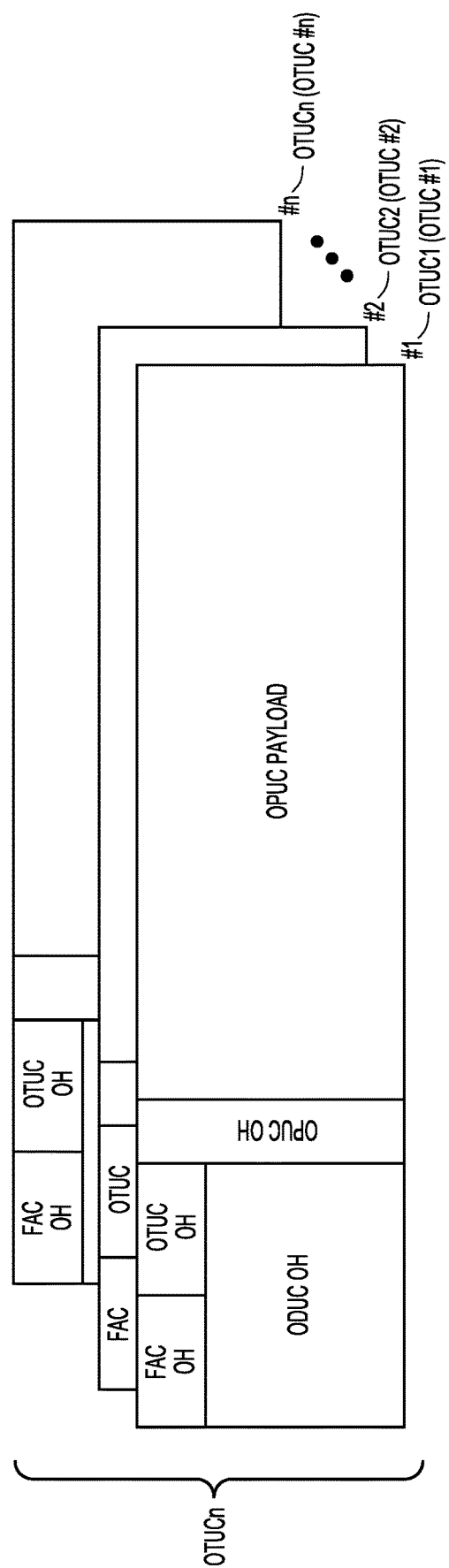
FIG. 3 is an illustration of an OTUCn comprising n×OTUC (i.e., n OTUCs) multiplexed into the OTUCn, according to an example embodiment.

With reference to FIG. 3, there is an illustration of an OTUCn shown as comprising n×OTUC (i.e., n OTUCs) multiplexed into the OTUCn. Thus, the OTUCn includes OTUCs OTUC1-OTUCn (or OTUC #1-OTUC #4). The OTUCn has an aggregate rate of n×100 G.

Figure 4:
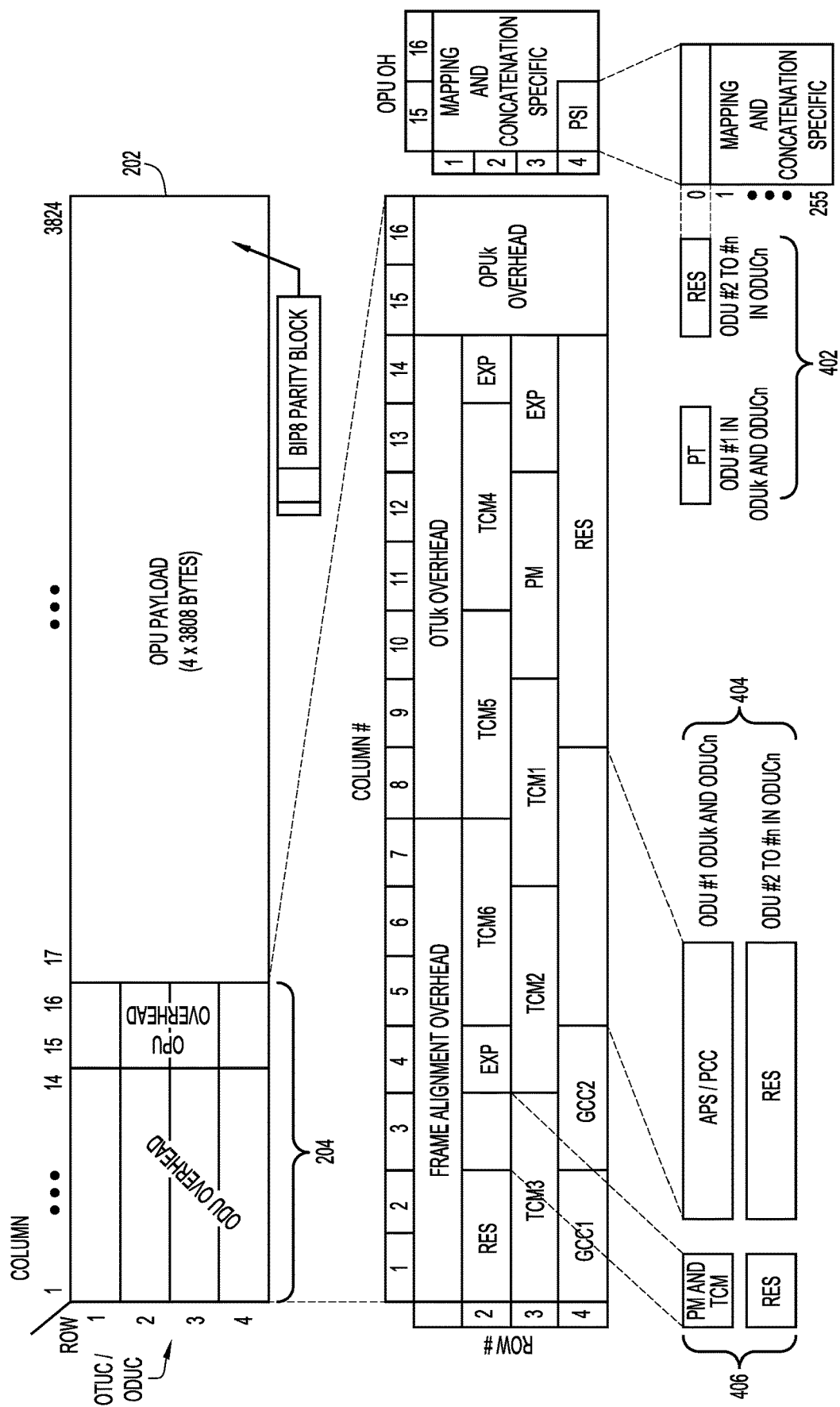
FIG. 4 is an illustration of overhead in OTUC #1 and each of OTUC #2-OTUC #n in the OTUCn of FIG. 2, according to an example embodiment.

With reference to FIG. 4, there is an illustration of overhead 204 in OTUC #1 and each of OTUC #2-OTUC #n in the OTUCn of FIG. 2. The following list defines abbreviations and acronyms used in FIG. 4:
PM Path monitoring
TCM Tandem connection monitoring
RES Reserved for future international standardization, i.e., spare or unused
EXP Experimental
GCC General communication channel
APS Automatic protection switching coordination channel
PCC Protection communication control channel
BIAE Backward incoming alignment error
TTI Trail trace identifier
BIP8 Bit interleaved parity—level 8
PSI Payload structure identifier
PT Payload type In accordance with B100 G, overhead 204 includes multiple distinct fields including (i) already defined (i.e., predefined) or "used" fields that carry specific information, such as the fields labelled TCM3, APS/PCC, and so on, and (ii) undefined or "unused" fields, including the fields labelled reserved "RES," which represent spare overhead fields available for future use/definition. The used fields and the unused fields are referred to herein as "used overhead" and "unused overhead" of overhead 204, respectively. Embodiments presented herein store in the unused overhead (and not in the used overhead) (i) security control information/parameters associated with encryption, and/or (ii) information used for authentication, such as an integrity check value (ICV), as will be described more fully below.

As shown in FIG. 4, OTUC #1 represents a master OTUC that uses more overhead than each of OTUC #2-OTUC #n, which represent slave OTUCs. See, e.g., fields 402-406 in FIG. 4. Specifically, the used/unused overhead of OTUC #1 is larger/smaller in size than the used/unused overhead of each of OTUC #2-OTUC #n. Thus, more security control information and ICV information may be stored in slaves OTUC #2-OTUC #n than in master OTUC #1.

Figure 5:
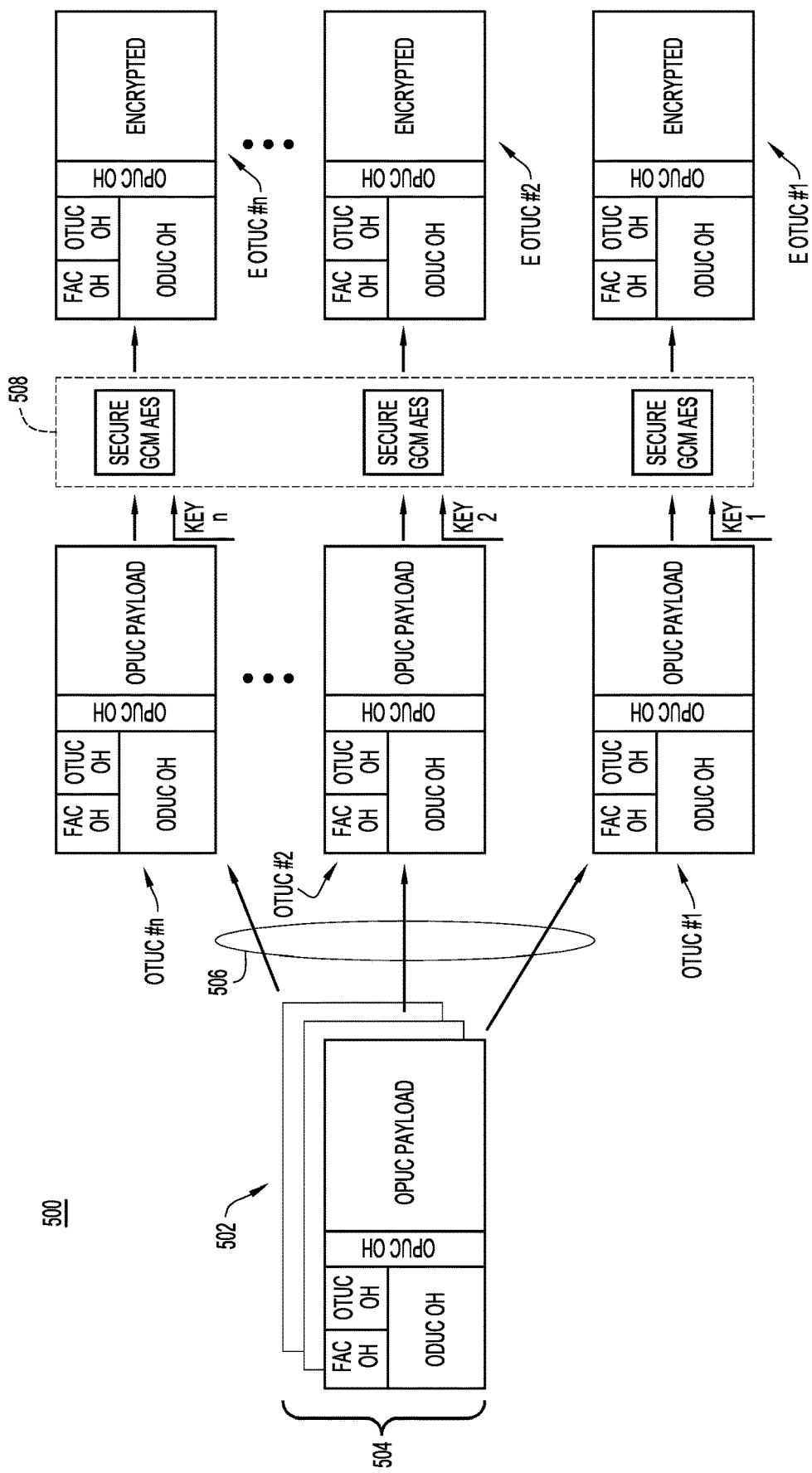
FIG. 5 is an illustration of a method of adding security protection, including encryption, to OTUCn performed by a transmit processor of the node of FIG. 1, according to an example embodiment.

With reference to FIG. 5, there is an illustration of an example method 500 of adding security protection, including encryption, to OTUCn that may be performed primarily by TX processor 104 of node 100.

At 502, TX processor 104 receives, from one or more clients, data traffic 504 having an aggregate data rate of n×100 G. Data traffic 504 may be unformatted traffic. Alternatively, data traffic 504 may include traffic previously formatted into data frames in accordance with any known or hereafter developed frame format.

At 506, TX processor 104 divides or separates data traffic 504 into parallel paths, i.e., into OTUC #1-OTUC #n, each having a data rate of 100 G.

Prior to next operation 508, TX processor 104 uses any known or hereafter developed technique to acquire and then store locally encryption keys Key1-Keyn.

At 508, TX processor 104 encrypts each of OTUC #1-OTUC #n individually and in parallel using a respective one of encryption keys Key1-Keyn in accordance with an encryption protocol, to produce respective ones of encrypted (E) OTUC #1-OTUC #n, i.e., to produce OTUC #1-OTUC #n each in encrypted form. Operation 508 may encrypt only an OPUC payload in each OTUC, or additional portions of the OTUC. In the example of FIG. 5, operation 508 uses an Advance Encryption Standard (AES)-Galois/Counter Mode (GCM) encryption technique to encrypt each OTUC; however, it is understood that any known or hereafter developed encryption technique may be used.

Also at 508, TX processor 104 defines security control information/parameters, including a secure tag, used to encrypt each of OTUC #1-OTUC #n, and which may be used to decrypt the encrypted OTUCs. TX processor 104 inserts the security control information into either (i) the unused overhead of OTUC #2 as encrypted and not the unused overhead of OTUC #1 as encrypted, or (ii) the unused overhead of both OTUC #2 and OTUC #1 as encrypted, in which case the security control information is spread across the unused overhead of both OTUC #1 and OTUC #2, as encrypted. The security control information identifies Keys Key1-Keyn, and includes other security control information described in detail below.

Figure 6:
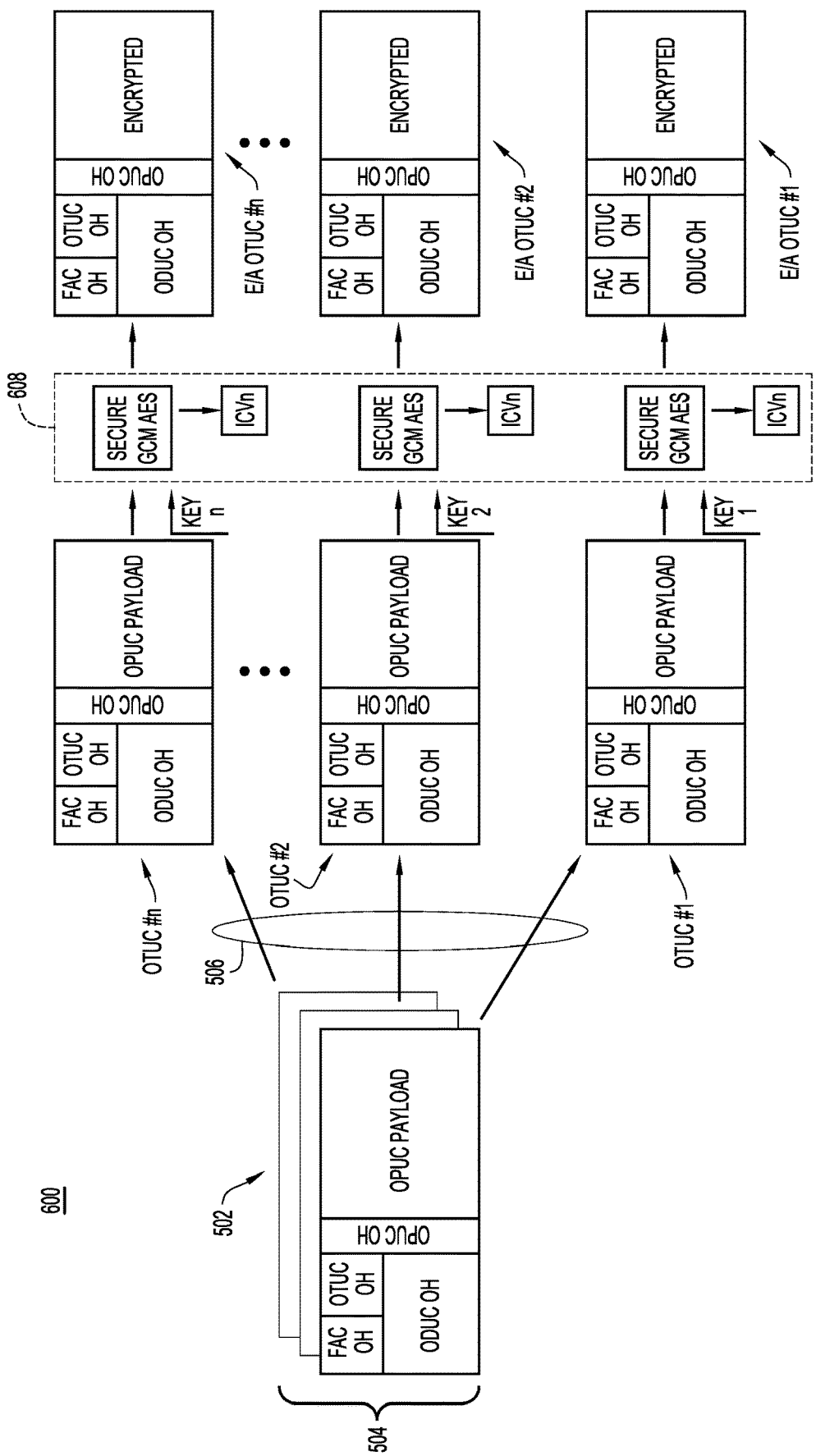
FIG. 6 is an illustration of a method of adding security protection, including encryption and authentication, to OTUCn performed by the transmit processor, according to an example embodiment.

With reference to FIG. 6, there is an illustration of an example method 600 of adding security protection, including both encryption and authentication, to OTUCn. Method 600 may be performed primarily by TX processor 104.

Method 600 includes initial operations 502 and 506 as in method 500, and then proceeds to 608.

At 608, TX processor 104 encrypts each of OTUC #1-OTUC #n individually and in parallel using a respective one of encryption keys Key1-Keyn in accordance with an encryption protocol, as described above. TX processor 104 also authenticates each OTUC #1-OTUC #n individually in accordance with an authentication protocol, e.g., the TX processor generates from each of OTUC #1-OTUC #n a respective one of ICVs ICV1-ICVn. As a result, operation 608 produces, from OTUC #1-OTUC #n, respective ones of encrypted (E) and authenticated (A) A/E OTUC #1-OTUC #n, and ICVs ICV1-ICVn.

Also at 608, TX processor 104 defines the security control information as described above, and compresses the individual ICVs ICV1-ICVn into a single, compressed ICV that is smaller in size than an aggregate of the sizes of ICVs ICV1-ICVn. TX processor 104 inserts the security control information and the compressed ICV into either (i) the unused overhead of OTUC #2 as encrypted and authenticated, or (ii) the unused overhead of both OTUC #2 and OTUC #1 as encrypted and authenticated.

Figure 7:
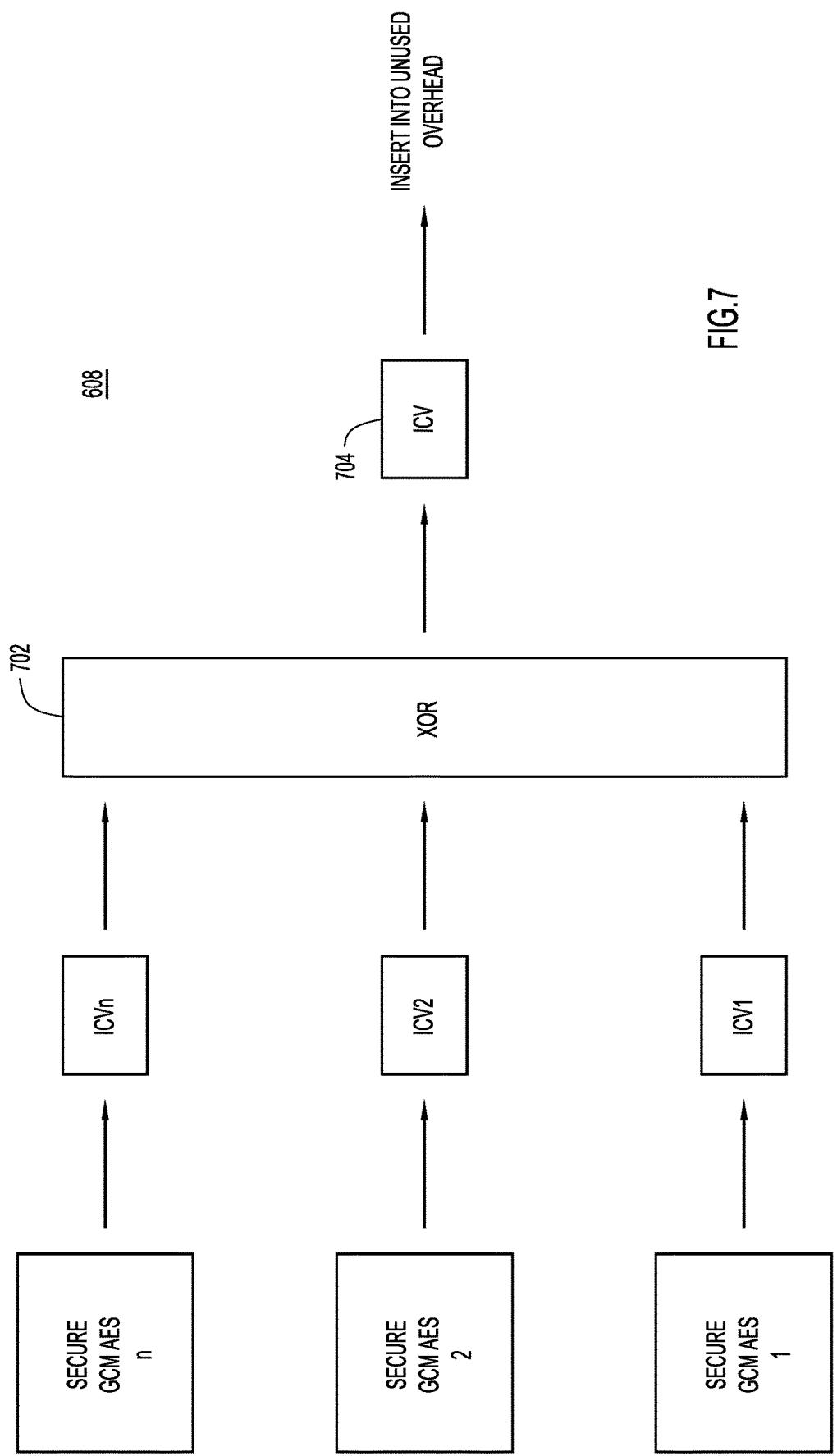
FIG. 7 shows operations of compressing integrity check values as performed in the method of FIG. 6, according to an example embodiment.

With reference to FIG. 7, there are shown operations expanding on operation 608 directed to compressing ICVs ICV1-ICVn. As shown in FIG. 7, operation 608 generates ICVs ICV1-ICVn in parallel as described above, and directs the parallel ICVs to an XOR operation 702. In an example, each ICVi may be a 16 bytes value. Operation 702 XORs ICVs ICV1-ICVn into a single, compressed ICV 704. In the example, Operation 702 compresses the n×16 bytes of ICVs ICV1-ICVn into a single 16 byte value. Operation 608 inserts compressed ICV 704 into unused overhead of OTUC #2 as encrypted and authenticated, for example.

Figure 8:
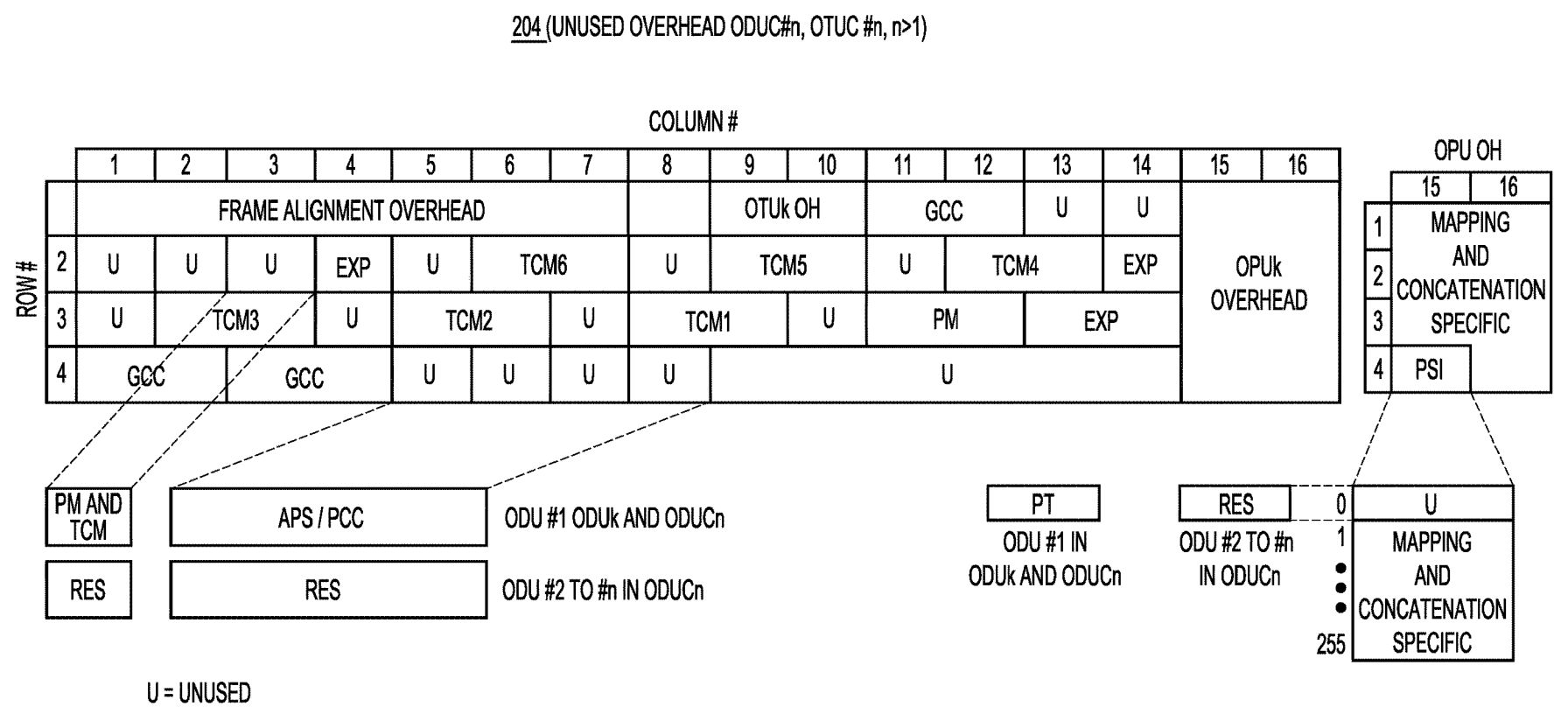

With reference to FIG. 8, there is an illustration of unused fields in the overhead (e.g., overhead 204) for ODUCn, where n>1, e.g., for ODUC #2, ODUC #3, and so on. The unused fields may be used to store the security control information and the compressed ICV described above. According to B100 G, ODUC #1 represents the master or fundamental ODUC for ODUCn, while ODUC #2-ODUCn represent slave ODUCs. Most of the fields of the overhead (e.g., overhead 204) of ODUC #1 are used, i.e., are already defined in B100 G, and carry important overhead information for ODUCn. On the other hand, the overhead of each slave ODUC includes more unused fields than used fields, as shown in FIG. 8. The GCC0, GCC1, GCC2 fields may be confined to ODUC #1, but B100 G indicates that the multiple GCC fields may be concatenated to form a single larger field. Also, while B100 G defines the EXP field, the EXP field may also be used to store security control information.

The embodiments described above add security protection to OTUCs of OTUCn in accordance with a security protocol (e.g., encryption protocol) and insert security control information, including a secure tag, into unused overhead of various ones of the security protected OTUCs. The security control information depends in part on the security protocol. In an embodiment that uses a security protocol similar to media access control security protection (MACsec), the security control information may include the following security control information/parameters:

a. Packet Sequence Number (PN), incremented each frame (since one frame corresponds to one packet);

b. Tag Control Information (TCI), including version, ES, SC, SCB, E, and C, which indicates how OTUCn is security protected;

c. Association Number (AN) or key index, which identifies which keys are used to encrypt which OTUCs. Multiple ANs may be specified;

d. Optional Cyclic Redundancy Check (CRC), computed over one or more (or all) fields of the secure tag; and e. Optional Nonce. The Nonce may be used by GCM and inserted into the transmitted packet or implicitly shared by the MACsec Key Agreement (MKA), as is done in XPN MACSEC for key distribution.

The TCI, AN, and CRC collectively represent a secure tag (also referred to as a "SecTag" and a "security tag"). The parameters of the security control information may have the following sizes: PN=8 bytes; TCI+AN=1 byte; CRC 1 byte; and Nonce=4 bytes. In addition, the compressed ICV may use 16 bytes. Thus, the embodiments may take advantage of 10 bytes of unused overhead in ODUC #1 and 20 bytes of unused overhead in ODUC #2 to store the above-listed security control information of the secure tag and the compressed ICV in the ODUCs.

With reference to FIG. 9, there is an illustration of an example allocation 900 of security control information across the overhead of both ODUC #1 and ODUC #2. Allocation 900 inserts (i) a secure tag (i.e., TCI, AN, and CRC) and a Nonce into the unused overhead of ODUC #1, and (ii) a PN and a compressed ICV into the unused overhead of ODUC #2.

With reference to FIG. 10, there is an illustration of example allocation 1000 of security control information only in the overhead of ODUC #2. The allocation of FIG. 10 inserts a secure tag (TCI, an AN, a CRC), a Nonce, a PN, and a compressed ICV only into the unused overhead of ODUC #2. In some implementations, the secure tag may also include the PN.

Figure 11:
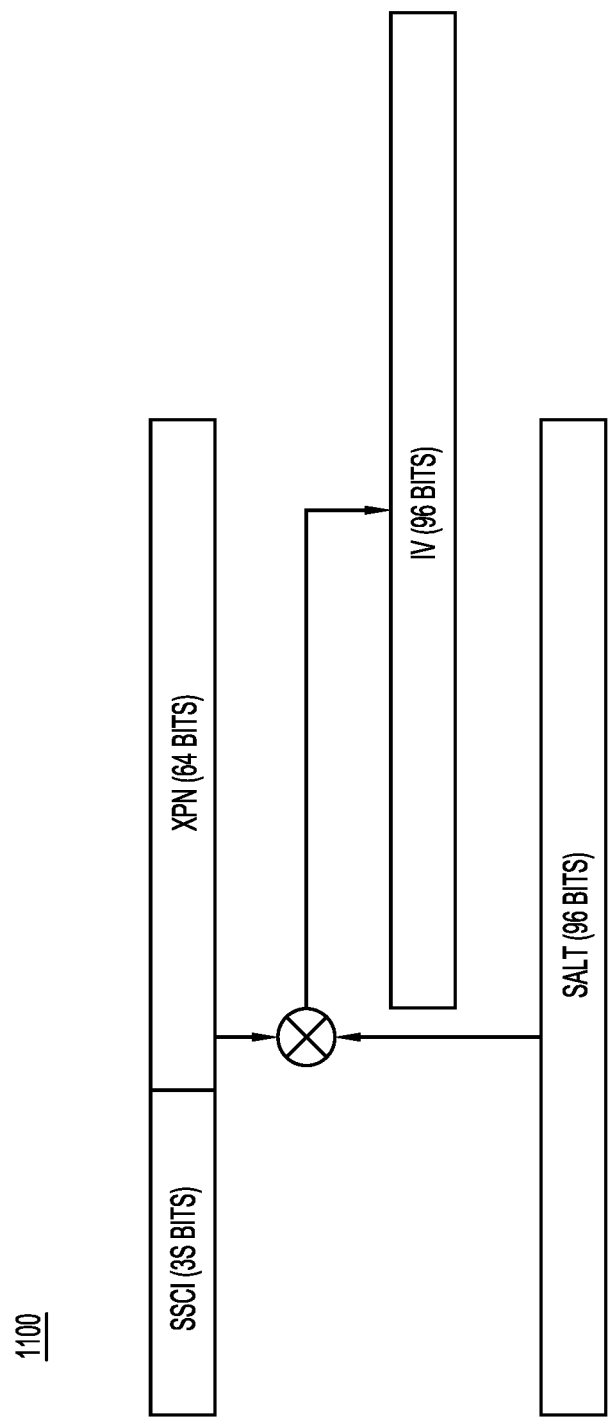
FIG. 11 is an illustration of a method of adding security protection to ODUCn based on Extended Packet Numbering (XPN) MACsec, according to an example embodiment.

With reference to FIG. 11, there is an illustration of a method 1100 of adding security protection to ODUCn based on Extended Packet Numbering (XPN) MACsec. XPN MACsec defines an initial value (IV) Nonce (96 bits) as a short secure channel identifier (SSCI (32 bits) XPN (64 bits)) XOR Salt (96 bits). Where the SSCI, and the Salt are assigned to each sender transmitting frames. The SSCI is heuristically assigned by MKA at the time MACsec security associations (SAs) are installed. The Salt value is unique for every value of K, and is derived by MKA from several parameters unique to the MACsec session. For XPN MACsec, the PN may be defined as follows:
  a. MFAS+4 PN Bytes=14 days; and
  b. MFAS+5 PN Bytes=10 year (3788 days)
The PN can be decreased down to 5 bytes (+MFAS).
The secure tag has the following format:
  a. SecTag[1:0]:
    [1] AN=Association Number=Key index;
  b. SecTag[3:2]:
    [2] Encryption enable/Disable; and
    [3] Authentication enable/disable;
  c. SecTag[6:4]:
    [4] Secure Remote Defect Indication;
    [5] Authentication error (ICV mismatch); and
    [6] Next key (AN+1) available.

The Nonce may be explicitly transported over the frame/packet or may be distributed by MKA protocols at link start-up. The Nonce or Salt may be up to 96 bits and may be transported in plaintext mode. An implicit mode does not use any transmission bandwidth. Otherwise, in an explicit mode, the Nonce/Salt may be explicitly transported over multiple frames using an MFAS that increments+1 each frame. MFAS (3:0) are used to index a single Overhead byte carrying Nonce. Up to 16 bytes may be transported (Nonce/Salt (15:0)). Thus, in terms of overhead bytes of an OTUC:
  a. 1 OH byte: MFAS (3:0);
  b. 2 OH bytes: MFAS (2:0); and
  c. 4 OH bytes: MFAS (1:0)
This results in the following use of overhead:
  a. PN=min 5 bytes, max 8 bytes;
  b. SecTag=min 1 bytes, max 2 bytes (+1 CRC);
  c. ICV=6 bytes; and
  d. Nonce=min 0/1/2/4/8 bytes.
Thus, overall, between 22 bytes and 34 bytes of overhead are requested.

In accordance with the B100 G standard, an ODUC1 is capable of carrying an ODU4 client, and an ODUC4 is capable of carrying a 400 GbE client. OTUCn represents a modular frame structure such that any protocol carrying data at data rates in excess of 100 G (e.g., 400 Gigabit Ethernet, 1 Terabyte (T), and 10 T) may be split over multiple 100 G and multiple ODUC.

Figure 12:
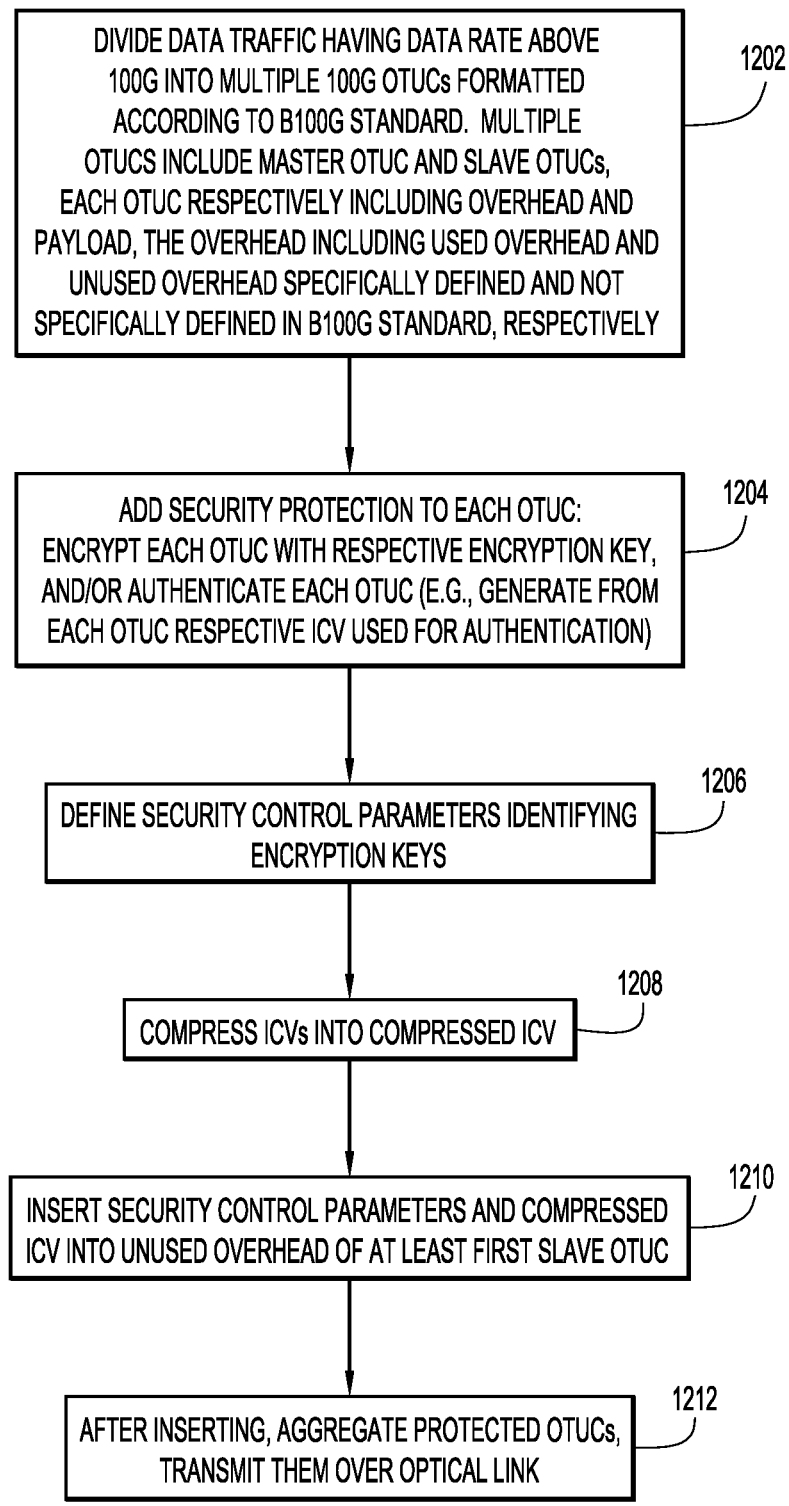
FIG. 12 is a flowchart of a method of adding security protection to OTUCs of B100 G, according to an example embodiment.

FIG. 12 is a flowchart of a method 1200 of adding security protection to OTUCs of B100 G, according to an example embodiment. Method 1200 may be performed primarily by node 100.

At 1202, node 100 divides data traffic having a data rate above 100 G into multiple 100 G OTUCs formatted according to B100 G, i.e., in the OTUCn hierarchy. The multiple OTUCs include a master OTUC and one or more slave OTUCs (i.e., OTUC #1 and OTUC #2-OTUC #n). Each OTUC respectively includes overhead and a payload. The overhead includes used overhead and unused overhead (i.e., spare or reserved overhead) specifically defined and not specifically defined in B100 G, respectively. The master OTUC includes less unused overhead than each slave OTUC in accordance with B100 G.

At 1204, node 100 adds security protection to each OTUC:
  a. Encrypt each OTUC with a respective one of multiple encryption keys; and/or
  b. Generate from each OTUC a respective ICV used for authenticating the OTUC.

At 1206, node 100 defines/generates security control information used to security protect the OTUCs. The security control information includes a security tag that identifies the encryption keys, along with other security control information.

At 1208, node 100 compresses the individual ICVs into a single, compressed ICV.

At 1210, node 100 inserts the security control information and the compressed ICV into unused overhead of at least a first one of the slave OTUCs (as protected after 1208).

At 1212, after 1210, node 100 aggregates the security protected OTUCs (carrying the inserted information) and transmits the resulting signal over an optical channel in accordance with B100 G.

Figure 13:
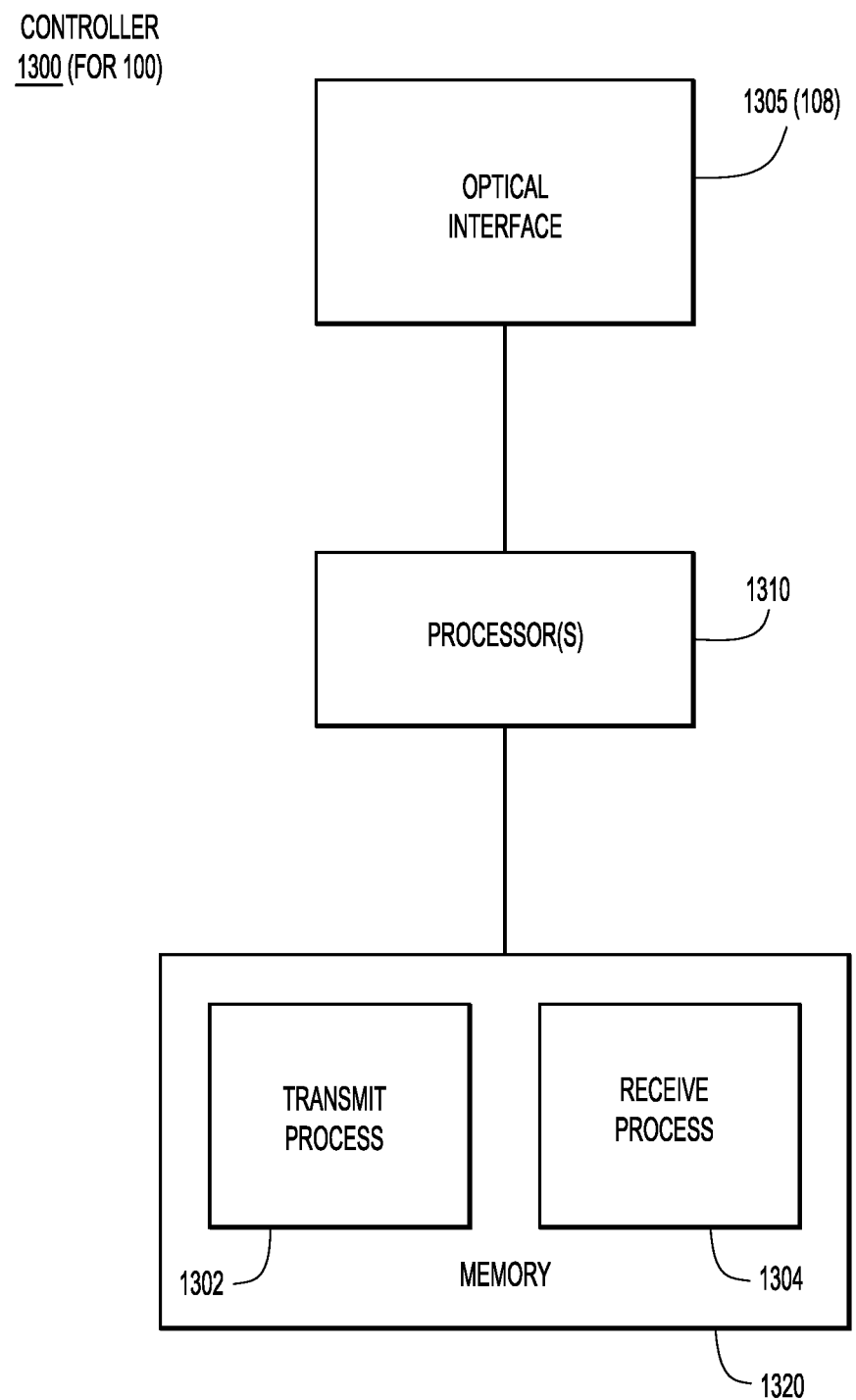
FIG. 13 is a block diagram of a controller of the node of FIG. 1, according to an example embodiment.

With reference to FIG. 13, there is depicted a block diagram of an example controller 1300 of network device 100. Controller 1300 includes an optical interface unit 1305 corresponding to optical transceiver 108 configured to enable controller 1300 to transmit/receive optical signals to/from an optical medium. That is, the low-level optical transceiver includes an optical transmitter to convert electrical signals (e.g., in digital form) from one or more processor(s) 1310 to optical signals and transmit the optical signals over an optical medium, and an optical receiver to convert optical signals received over the optical medium to electrical signals (e.g., in digital form) and deliver the electrical signals to the one or more processor(s). One or more processors 1310 are provided that execute software stored in memory 1320. Processor(s) 1310 include, for example, one or more microprocessors and/or microcontrollers. To this end, the memory 1320 stores instructions for software stored in the memory that are executed by processor(s) 1310 to perform the methods described herein.

Memory 1320 may comprise read/write memory, read only memory (ROM), random access memory (RAM), magnetic disk storage media devices, optical storage media devices, flash memory devices, electrical, optical, or other physical/tangible memory storage devices. Thus, in general, the memory 1320 may comprise one or more tangible (non-transitory) computer readable storage media (e.g., a memory device) encoded with software comprising computer executable instructions and when the software is executed (by the processor(s) 1310) it is operable to perform the operations described herein. Memory 1320 may store logic for a transmit process 1302 and a receive process 1304 to implement TX processor 104 and RX processor 106, respectively.

In addition, memory 1320 stores data used and generated by the processor 1310 when executing the logic described above.

In summary, security protection of frames is not defined by ITU G.709 for B100 G and OTN does not allow tagging insertion used for authentication. Accordingly, embodiments presented herein provides security protection to each OTUC (100 G frame) individually. The embodiments encrypt and authenticate each 100 G frame (each OTUC has its own key) and then aggregate the resulting security protected frames for transmission over a DWDM link. The security protection shares a single secure overhead, including a secure tag, packet number, and authentication field for the 100 G frames (OTUC), even if each frame is encrypted using its own independent key. Furthermore, each 100 G frame has its own ICV, but the ICVs are compressed into a single ICV tag. In this way n×16 (ICV) bytes are compressed to 16 bytes. Such compression is advantageous because the OTN overhead bytes for each OTUC frame are limited (14×4 bytes=56 bytes) and most of those bytes are already defined by ITU G.709. 9 bytes are reserved for further study for each OTUC and they are not enough in order to transport multiple 16 bytes ICVs.

The embodiments use the overhead of the second OTUC #2 as security protection overhead. While the first 100 G block (OTUC #1) is used for standardized functions and has few (9) reserved bytes, the second 100 G block (OTUC #2) is used to provide better granularity to bit interleaved parity errors (check incoming bit errors) but leaves more bytes to be used for the secure tag and the ICV. One embodiment uses overhead bytes of the second 100 G block/frame (OTUC #2), but not any overhead bytes of the first 100 G block/frame (OTUC #1), while another embodiment uses 10 bytes of the first 100 G block (OTUC #1) and 20 bytes of the second 100 G block (ODUC #2). The embodiments may use: PN=8 bytes; ICV=16 bytes; TCI+AN=2 Bytes; and Nonce=4 Bytes (Optional). Such tagging allows the use of algorithms similar to GCM, which is already developed for MACSEC. This structure is modular and enables encryption of any traffic since encryption and authentication are done at multiples of 100 G frames. For example, 2T traffic can be encrypted because it uses a 20×100 G encryption module.

More specifically, embodiments (i) split OTN traffic beyond 100 G into multiple 100 G frames (OTUC) as defined by ITU G.709, (ii) define unique security control information, including a secure tag that contains a key index, authentication/encryption enable bits, and so on, common to n×OTUC, for transport in the second OTUC #2, (iii) calculate for each 100 G frame (OTUC) its corresponding ICV, (iv) combine the resulting ICVs (n×ICV) into a single ICV, and (v) insert the single ICV into the second OTUC #2. In this way a reduced number of secure overhead bytes are requested and can be inserted into the OTUCn hierarchy allowing the MIMIC of MACSEC over OTN beyond 100 G.

In summary, in one form, a method is provided comprising: dividing data traffic into multiple optical transport units formatted according to an optical transport network (OTN) standard, the multiple optical transport units including a master optical transport unit and one or more slave optical transport units, each optical transport unit respectively including overhead and a payload, the overhead including used overhead specifically defined in the OTN standard and unused overhead not specifically defined in the OTN standard; encrypting each optical transport unit with a respective one of multiple encryption keys; defining security control parameters identifying the multiple encryption keys; inserting the security control parameters into the unused overhead of a first slave optical transport unit among the one or more slave optical transport units; and after the inserting, transmitting the optical transport units over an optical channel in encrypted form. In an embodiment, the data traffic has a data rate above 100 Gigabits/second (100 G), and the dividing includes dividing the data traffic into multiple 100 G optical transport units (e.g., OTUCs) formatted according to a beyond 100 G OTN standard.

In another form, an apparatus is provided comprising: a processor configured to: divide data traffic into multiple optical transport units formatted according to an optical transport network (OTN) standard, the multiple optical transport units including a master optical transport unit and one or more slave optical transport units, each optical transport unit respectively including overhead and a payload, the overhead including used overhead specifically defined in the OTN standard and unused overhead not specifically defined in the OTN standard; encrypt each optical transport unit with a respective one of multiple encryption keys; define security control parameters identifying the multiple encryption keys; insert the security control parameters into the unused overhead of a first slave optical transport unit among the one or more slave optical transport units; and an optical interface configured to, after the insert operation, transmit the optical transport units over an optical channel in encrypted form.

In yet another form, a non-transitory computer readable medium is provided. The computer readable medium is encoded with instruction that, when executed by a processor of a transmitter, cause the processor to perform: dividing data traffic into multiple optical transport units formatted according to an optical transport network (OTN) standard, the multiple optical transport units including a master optical transport unit and one or more slave optical transport units, each optical transport unit respectively including overhead and a payload, the overhead including used overhead specifically defined in the OTN standard and unused overhead not specifically defined in the OTN standard; encrypting each optical transport unit with a respective one of multiple encryption keys; defining security control parameters identifying the multiple encryption keys; inserting the security control parameters into the unused overhead of a first slave optical transport unit among the one or more slave optical transport units; and after the inserting, causing the optical transport units to be transmitted over an optical channel in encrypted form.

Various modifications and structural changes may be made therein without departing from the scope of the concepts described herein and within the scope and range of equivalents of the claims.

What is claimed is:

1. A method, comprising:
dividing data traffic into multiple optical transport units formatted according to an optical transport network (OTN) standard, the multiple optical transport units including a master optical transport unit and one or more slave optical transport units, each optical transport unit respectively including overhead and a payload, the overhead including used overhead specifically defined in the OTN standard and unused overhead not specifically defined in the OTN standard;
encrypting each optical transport unit with a respective one of multiple encryption keys;
defining security control parameters identifying the multiple encryption keys, the security control parameters including a packet sequence number for replay protection, and a secure tag including tag control information (TCI) and one or more association numbers (ANs) identifying the encryption keys;
generating from each of the multiple optical transport units a respective integrity check value (ICV) for authenticating the optical transport unit, to produce multiple ICVs, one for each of the optical transport units;
compressing the multiple ICVs into a compressed ICV;
inserting the security control parameters into the unused overhead of a first slave optical transport unit among the one or more slave optical transport units, and inserting the compressed ICV into the unused overhead of the first slave optical transport unit and not into the unused overhead of the master optical transport unit; and
after the inserting, transmitting the optical transport units over an optical channel in encrypted form.

2. The method of claim 1,
wherein the encrypting includes Advance Encryption Standard (AES)-Galois/Counter Mode (GCM) encryption.

3. The method of claim 2, wherein
the compressing the multiple ICVs into the compressed ICV includes performing an XOR operation on the multiple ICVs.

4. The method of claim 1, wherein:
the unused overhead of the master optical transport unit is smaller in size than the unused overhead of the first slave optical transport unit; and
the inserting includes inserting the security control parameters and the compressed ICV into the unused overhead of the first slave optical transport unit and not into the unused overhead of the master optical transport unit.

5. The method of claim 1, wherein the unused overhead of the master optical transport unit is smaller in size than the unused overhead of the first slave optical transport unit, and the inserting further includes:
inserting a first portion of the security control parameters into the unused overhead of the first slave optical transport unit; and
inserting a second portion of the security control parameters into the unused overhead of the master optical transport unit.

6. The method of claim 1, wherein the inserting further includes:
inserting the compressed ICV only into the unused overhead of the first slave optical transport unit.

7. The method of claim 1, wherein:
the overhead of each optical transport unit further includes optical transport unit overhead, optical data unit overhead, and optical packet unit overhead defined in accordance with the OTN standard; and
the inserting includes inserting the security control parameters and the compressed ICV into the optical data unit overhead.

8. The method of claim 7, wherein the inserting further includes inserting the compressed ICV only into the optical data unit overhead.

9. The method of claim 1, wherein the security control parameters further include a cyclic redundancy check (CRC) computed over one or more fields of the secure tag.

10. The method of claim 9, wherein the secure tag further includes a nonce associated with the encrypting.

11. The method of claim 1, wherein the data traffic has a data rate above 100 Gigabits/second (100 G), and the dividing includes dividing the data traffic into multiple 100 G optical transport units formatted according to a beyond 100 G OTN standard.

12. An apparatus, comprising:
a processor configured to:
divide data traffic into multiple optical transport units formatted according to an optical transport network (OTN) standard, the multiple optical transport units including a master optical transport unit and one or more slave optical transport units, each optical transport unit respectively including overhead and a payload, the overhead including used overhead specifically defined in the OTN standard and unused overhead not specifically defined in the OTN standard;
encrypt each optical transport unit with a respective one of multiple encryption keys;
define security control parameters identifying the multiple encryption keys, the security control parameters including a packet sequence number for replay protection, and a secure tag including tag control information (TCI) and one or more association numbers (ANs) identifying the encryption keys;
generate from each of the multiple optical transport units a respective integritycheck value (ICV) for authenticating the optical transport unit, to produce multiple ICVs, one for each of the optical transport units;
compress the multiple ICVs into a compressed ICV;
insert the security control parameters into the unused overhead of a first slave optical transport unit among the one or more slave optical transport units, and insert the compressed ICV into the unused overhead of the first slave optical transport unit and not into the unused overhead of the master optical transport unit; and
an optical interface configured to, after the insert operation, transmit the optical transport units over an optical channel in encrypted form.

13. The apparatus of claim 12, wherein the security control parameters further include a cyclic redundancy check (CRC) computed over one or more fields of the secure tag.

14. The apparatus of claim 13, wherein
the secure tag further includes a nonce.

15. The apparatus of claim 12, wherein:
the unused overhead of the master optical transport unit is smaller in size than the unused overhead of the first slave optical transport unit; and
the processor is configured to insert by inserting the security control parameters and the compressed ICV into the unused overhead of the first slave optical transport unit and not into the unused overhead of the master optical transport unit.

16. The apparatus of claim 12, wherein the unused overhead of the master optical transport unit is smaller in size than the unused overhead of the first slave optical transport unit, and the processor is configured to insert by:
inserting a first portion of the security control parameters into the unused overhead of the first slave optical transport unit; and
inserting a second portion of the security control parameters into the unused overhead of the master optical transport unit.

17. A non-transitory computer readable medium encoded with instructions that, when executed by a processor, cause the processor to perform operations including:
dividing data traffic into multiple optical transport units formatted according to an optical transport network (OTN) standard, the multiple optical transport units including a master optical transport unit and one or more slave optical transport units, each optical transport unit respectively including overhead and a payload, the overhead including used overhead specifically defined in the OTN standard and unused overhead not specifically defined in the OTN standard;
encrypting each optical transport unit with a respective one of multiple encryption keys;
defining security control parameters identifying the multiple encryption keys, the security control parameters including a packet sequence number for replay protection, and a secure tag including tag control information (TCI) and one or more association numbers (ANs) identifying the encryption keys;
generating from each of the multiple optical transport units a respective integrity check value (ICV) for authenticating the optical transport unit, to produce multiple ICVs, one for each of the optical transport units;

compressing the multiple ICVs into a compressed ICV;
inserting the security control parameters into the unused overhead of a first slave optical transport unit among the one or more slave optical transport units, and inserting the compressed ICV into the unused overhead of the first slave optical transport unit and not into the unused overhead of the master optical transport unit; and
after the inserting, causing the optical transport units to be transmitted over an optical channel in encrypted form.

18. The computer readable medium of claim 17, wherein the security control parameters further include a cyclic redundancy check (CRC) computed over one or more fields of the secure tag.

19. The computer readable medium of claim 18, wherein the secure tag further includes a nonce associated with the encrypting.

20. The computer readable medium of claim 17, wherein:
the unused overhead of the master optical transport unit is smaller in size than the unused overhead of the first slave optical transport unit; and
the instructions to cause the processor to perform the inserting include instructions to cause the processor to perform inserting the security control parameters and the compressed ICV into the unused overhead of the first slave optical transport unit and not into the unused overhead of the master optical transport unit.

\* \* \* \* \*